Jan. 10, 1928.
A. R. LUKENS
1,656,072
STORAGE BATTERY CONTAINER
Filed April 12, 1923
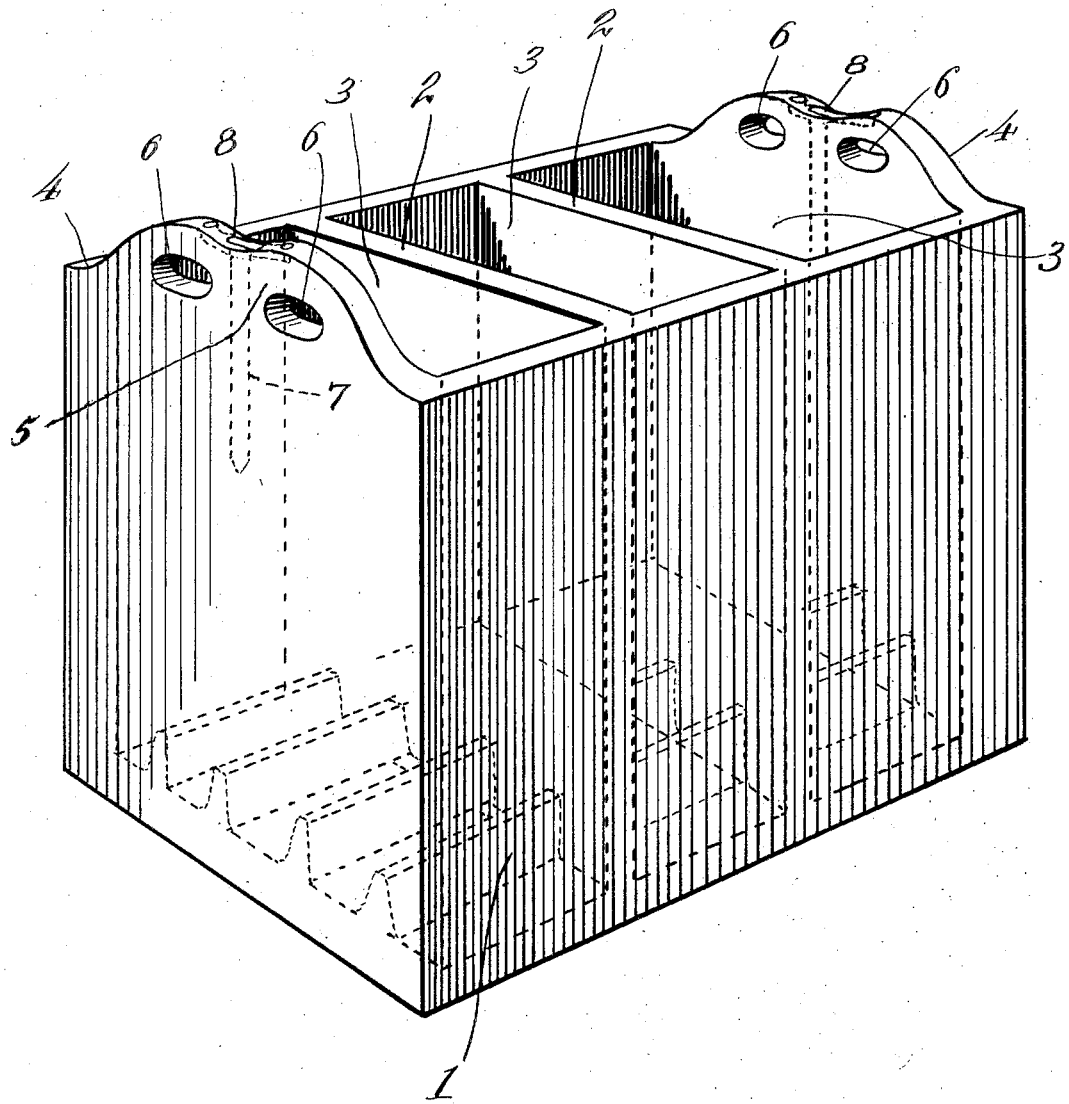
INVENTOR:
Alan R. Lukens
BY
Allen+Allen
ATTORNEYS.

UNITED STATES PATENT OFFICE.

ALAN R. LUKENS, OF WYOMING, OHIO, ASSIGNOR TO THE RICHARDSON COMPANY, OF LOCKLAND, OHIO, A CORPORATION OF OHIO.

STORAGE-BATTERY CONTAINER.

Application filed April 12, 1923. Serial No. 631,744.

My invention relates to containers for storage batteries formed of a composition which is moldable, to the extent of forming the container with partitions that provide cell spaces without the use of separate jars.

There has been a wide development in recent years in the production of the so-called "one piece" battery container, which as noted provides for the cell spaces in the structure of the container itself.

There has not, however, so far as I am advised, been offered a container of this character, in which all of the necessary functions in a completely effective structure for the noted purpose, have been provided.

The usual composition is of rubber mixed with various kinds of fillers, mineral and vegetable, which give some tensile strength, and at the same time provide bulk in the shape of less expensive material than rubber. These compositions cannot in the nature of vulcanized rubber itself, provide the necessary strength to resist the shocks to which a storage battery in an automobile, is subjected, and neither do they provide a material which is resistant to electrolytic action, and to acid to the extent of avoiding discoloration, when subjected thereto, and at the same time will resist electric seepage, and resist the fatigue of continual vibration.

The greatest disadvantage to the use of rubber aside from the above is that it is costly, and my efforts have been directed to the production of a less costly material, and one in which the operation of molding does not require a lengthy exposure to heat and pressure, but rather to one which can be quickly compressed in a mold, and released therefrom.

The basic product of my box is formed of asphalt, which is one of the best acid resistant substances known. It is inexpensive and can be made into a box of generous size, which is not practical in rubber compositions, which are too expensive to permit of a generous use of material.

I am aware that others have employed asphalt or suggested its use in the formation of battery containers of the "one piece" type, but these structures have so far as I have been able to determine, one defect or another, usually resulting from the nature of the filler and binder used, or method of incorporating the same in the asphalt, or of the lack of ability in the producers of these devices to provide as asphalt of the proper blend.

In a companion application filed of even date herewith upon dielectric compositions, I have set forth a material, and a process of making the same, which I have discovered to have every quality necessary for a one piece battery container, and which has resistance to break down as a storage battery in every requirement that is far in excess of any demands likely to be made upon the product.

The necessary characteristics of a battery box are tensile strength, transverse strength, good fiber stress factor, resistance to fatigue, acid resistance under electrical charge and discharge, resistance to the stress resulting from the freezing of the electrolyte in a nearly discharged battery, a good low frequency dielectric break-down value, very low moisture absortion, negligible electrical seepage, resistance to shock, and resistance to distortion of shape under stress, pressure, or under the influence of heat resulting from the common practice of overcharging batteries. Also the composition should be readily moldable, and quickly setting, and well responding to great pressures in the mold, which among other things permits the forming of the handle on the box in the mold that forms the box itself.

It will be unnecessary to explain why the above various characteristics are required, if it be remembered that a battery box must contain from fifty pounds and upward of metal plates, and in motor vehicles must be carried in the frame thereof, and in service of any kind will be subjected to careless usage in the handling of acid and use of high electric charges.

My box has also a structural advantage in the form of a re-inforcement at the handle and hold down portions.

I will now proceed to more specifically describe my invention, and point out the novelty thereof in the appended claims.

In the drawing the figure is a perspective of my battery container.

Referring to the drawing, I show a box having sides 1, a base, and partitions 2 forming cells 3 for use as battery jars. At the ends of the box, I show handles 4, which in the preferred form have a central solid portion 5, with finger holes 6, 6, at the sides thereof.

The handles project above the top surface of the box, and are molded directly integral with the end wall of the box, as distinguished from being molded separately and then united with the box. This is a distinct advantage over any other premolded handle with which I am familiar, both in strength of handle and in simplicity of manufacture.

When molding the box, a piece of metal preferably lead coated steel rod, formed in the shape of a T, as indicated at 7, is molded into the end of the box with the top of the T lying at the apex of the handle, and exposed, at least at the central portions, as shown at 8. The hold down fasteners will engage over the exposed metal portion, and the exposed metal is well above the acid line of the box, all other parts of the rod being entirely surrouded by the box material.

With regard to the composition of the box, I have referred to my application filed of even date herewith, to which reference is hereby made. Briefly my material is a colloidal composition, possessing because of this peculiar physical characteristic, many qualities not to be found in a mere mixture of the elements to be described.

The preferred composition is formed of acid resisting asbestos in fibrous form colloidally suspended in a prepared bitumen, preferably asphaltic in nature. Preferably there will be vegetable fibers, such as cotton or felt fibers, also colloidally suspended, said fibers being as long as practical, and in a proportion which will not render the composition susceptible to acid under electrolytic charge and discharge. I find that 15% or more of vegetable fiber cannot be employed.

I will preferably use an asphaltic composition formed largely of gilsonite, or other hard, elastic, and temperature-resistant, bitumen. I blend this with a softer asphalt which develops the adhesive and cementitious characteristics necesarry to bind the fibrous material together in a rigid, homogeneous, resilient mass. In one composition, I have used around 40% asbestos, 10% cotton fiber and 50% of the above noted asphalt material.

As stated in my application referred to, in order to obtain a colloidal suspension of the fibrous materials, I incorporate them together with an aqueous constituent which forms a primary film on the individual fibers, and subsequently by mixing and heating replace this aqueous film with the bituminous binder.

With regard to the asbestos employed by me, I have discovered a means of using an amphibole or acid resistant asbestos and at the same time largely preserving it in a fibrous condition. It has been the understanding in the arts that chrysotile asbestos only "is of importance in the manufacture of molded insulation", (Plastics and molded electrical insulation—Emile Hemming-chemical Catalogue Co. N. Y. 1923). This is because it has been the general understanding that acid resistant asbestos products are so fragile that, in attempts to free them from the rock or gangue with which they appear in nature, the fibrous character of the material has been largely destroyed. It is possible to segregate these acid resistant asbestos or amphibole asbestos products by water flotation, but to dry them very economically requires an agitation and other action, which further breaks down the fibrous character too severely to permit full retention thereof. They have been dried with only partial loss of structure, but the processes are expensive.

By my process of using the fibrous constituents wet in the first place, and drying them after fibration during the formation of a colloidal mix, I can use a water flotation asbestos, and still retain the fibrous character, obtaining a material, which in the end is substantially dry. I also am provided with an aqueous constituent for the process without starting with a dry material.

After forming the colloidal mix described, I place the mixed material while hot into a mold and apply pressure thereto, which may be very great, and thus I form up the box quickly and easily, as this material will set almost at once, under pressure and holding in the mold for any long period is not required.

The resultant box, with simultaneously molded handle and re-inforcement, provides in every way for the qualities I have outlined. It can be formed with ribs for plate spacers, and for retaining the plate packs above the base of the box, and the surface will take a paint very readily. By the use of the term asphalt in my claims, I wish to include other hydro-carbon substances of like nature.

Having thus described my invention, what I claim as new and desire to secure by Letters Patent, is:—

1. A storage battery container comprising a molded box having cross partitions integral therewith, forming individual cell spaces, and handles molded with the box and projecting upwardly from the top thereof, and a metal re-inforcement molded into and concealed within the material in the ends of the box, and having a portion lying at the top of the handles, to re-inforce the handles where engaged by the box hold downs, said portion of the metal re-inforcement being exposed at the hold down point.

2. A storage battery container comprising a molded box, having cross partitions integral therewith, forming individual cell spaces, and handles molded with the box and projecting upwardly from the top thereof, and a metal re-inforcement comprising a T-shaped piece set into and concealed in the ends of the box with the top of the T exposed at the top of the handles, thus being above the acid line of the box, and located at a point to receive the contact of a hold down device.

ALAN R. LUKENS.